(12) United States Patent
Rayner et al.

(10) Patent No.: US 8,041,697 B2
(45) Date of Patent: Oct. 18, 2011

(54) SEMI-AUTOMATIC EXAMPLE-BASED INDUCTION OF SEMANTIC TRANSLATION RULES TO SUPPORT NATURAL LANGUAGE SEARCH

(75) Inventors: Emmanuel Rayner, Cambridge (GB); Richard Crouch, Cupertino, CA (US); Hannah Copperman, San Francisco, CA (US); Giovanni Lorenzo Thione, San Francisco, CA (US); Martin Henk Van Den Berg, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 425 days.

(21) Appl. No.: 12/201,066

(22) Filed: Aug. 29, 2008

(65) Prior Publication Data
US 2009/0138454 A1 May 28, 2009

Related U.S. Application Data

(60) Provisional application No. 60/969,472, filed on Aug. 31, 2007, provisional application No. 60/969,486, filed on Aug. 31, 2007.

(51) Int. Cl.
*G06F 17/30* (2006.01)
(52) U.S. Cl. .......................... 707/705; 704/9
(58) Field of Classification Search .............. 707/705; 704/9
See application file for complete search history.

(56) References Cited

U.S. PATENT DOCUMENTS

| | | | |
|---|---|---|---|
| 5,933,822 A | 8/1999 | Braden-Harder et al. |
| 6,185,592 B1 | 2/2001 | Boguraev et al. |
| 6,243,670 B1 | 6/2001 | Bessho et al. |
| 6,366,908 B1 | 4/2002 | Chong et al. |
| 6,654,740 B2 | 11/2003 | Tokuda et al. |
| 6,675,159 B1 | 1/2004 | Klein et al. |
| 6,678,677 B2 | 1/2004 | Floux et al. |
| 6,766,316 B2 | 7/2004 | Caudill et al. |
| 6,766,320 B1 | 7/2004 | Wang et al. |
| 6,795,820 B2 | 9/2004 | Barnett |
| 6,947,923 B2 | 9/2005 | Cha et al. |
| 7,027,974 B1 | 4/2006 | Busch et al. |
| 7,225,121 B2 | 5/2007 | Maxwell et al. |
| 7,319,951 B2 | 1/2008 | Rising et al. |
| 7,389,224 B1 | 6/2008 | Elworthy |
| 7,401,077 B2 | 7/2008 | Bobrow et al. |

(Continued)

OTHER PUBLICATIONS

International Search Report dated Mar. 26, 2009 in International Application No. PCT/US2008/074935.

(Continued)

*Primary Examiner* — Sheree N Brown
(74) *Attorney, Agent, or Firm* — Hope Baldauff Hartman, LLC

(57) ABSTRACT

Technologies are described herein for generating a semantic translation rule to support natural language search. In one method, a first expression and a second expression are received. A first representation is generated based on the first expression, and a second representation is generated based on the second expression. Aligned pairs of a first term in the first representation and a second term in the second representation are determined. For each aligned pair, the first term and the second term are replaced with a variable associated with the aligned pair. Word facts that occur in both the first representation and the second representation are removed from the first representation and the second representation. The remaining word facts in the first representation are replaced with a broader representation of the word facts. The translation rule including the first representation, an operator, and the second semantic representation is generated.

20 Claims, 5 Drawing Sheets

U.S. PATENT DOCUMENTS

| | | | |
|---|---|---|---|
| 7,403,938 | B2 | 7/2008 | Harrison et al. |
| 7,801,723 | B2 * | 9/2010 | Kaplan et al. ............... 704/9 |
| 7,827,029 | B2 * | 11/2010 | Kaplan et al. ............... 704/9 |
| 2005/0071150 | A1 | 3/2005 | Nasypny |
| 2005/0108630 | A1 | 5/2005 | Wasson et al. |
| 2006/0047632 | A1 | 3/2006 | Zhang |
| 2006/0184517 | A1 | 8/2006 | Anderson |
| 2007/0073533 | A1 | 3/2007 | Thione et al. |

OTHER PUBLICATIONS

Bontcheva et al., "Shallow Methods for Named Entity Coreference Resolution," Proceedings of the TALN 2002 Workshop. Nancy, France. Jun. 24-27, 2002, 9 pages.

Ng, Vincent "Shallow Semantics for Coreference Resolution," Proceedings of the Twentieth International Joint Conference on Artificial Intelligence (IJCAI), Hyderabad, India, Jan. 2007, pp. 1689-1694.

Duchier, Denys,"Constraint Programming for Natural Language Processing", retrieved at <<http://citeseerx.ist.psu. edu/viewdoc/download;jsessionid=F70461C9F31A4EB405543CE688CCBF3-D?doi=10.1.1.10.3152&rep=rep1&type=pdf>>, 2000. pp. 1-94.

"Powerset, Natural Language Search Engine", retrieved at <<http://googlesystem.blogspot.com/2007/02/powerset-natural-language-search-engine.html>>, Feb. 9, 2007. pp. 1-3.

Chien, Lee-Feng,"Fast and Quasi-Natural Language Search for Gigabytes of Chinese Texts", retrieved at <<http:// delivery.acm.org/10.1145/220000/215345/p112-chien.pdf? key1=215345&key2=4667021221&coll=GUIDE&dl=GUIDE&CFID=2506110&CFTOKEN=93982745>>, 1995. pp. 1-9.

Kolodner Janet L., "Indexing and Retrieval Strategies for Natural Language Fact Retrieval", retrieved z, retrieved at <<http://delivery.acm.org/10.1145/320000/319995/p434-kolodner.pdf?key1=319995&key2=1457021221&coll=GUIDE&dl=GUIDE&CFID=2551390&CFTOKEN=71366194>>ACM Transactions on Database Systems, vol. 8, No. 3, Sep. 1983. pp. 1-31.

Thione, et al., "Applying Term Occurrence constraints in natural language search", U.S. Appl. No. 60/969,406, filed Aug. 31, 2007.

Walters, et al., "Flexible Ranking infrastructure for query execution", U.S. Appl. No. 60/969,410, filed Aug. 31, 2007.

Walters, et al., "Checkpointing of composable lazily-evaluated integrators in search", U.S. Appl. No. 60/969,417, filed Aug. 31, 2007.

Thione, et al., "Indexing of alias clusters for search", U.S. Appl. No. 60/969,426, filed Aug. 31, 2007.

Crouch, et al., "Aboutness identification and indexing", U.S. Appl. No. 60/969,434, filed Aug. 31, 2007.

Polanyi, et al., "Valence calculus for indexing with special reference to reported speech and thought", U.S. Appl. No. 60/969,442, filed Aug. 31, 2007.

Snow, et al., "Bucketized threshold for runtime pruning of senses/ranking", U.S. Appl. No. 60/969,447, filed Aug. 31, 2007.

Pell, et al., "Hierarchal probability-based weighting for hypernyms in word sense disambiguation", U.S. Appl. No. 60/969,451, filed Aug. 31, 2007.

Biewald, et al., "Priority-based ranking functions for information retrieval", U.S. Appl. No. 6/969,453, filed Aug. 31, 2007.

Pell, et al.,"Priority-based disjunctive retrieval", U.S. Appl. No. 60/969,457, filed Aug. 31, 2007.

Rayner, et al., "Semi-automatic example-based induction of semantic translation rules to support natural language search", U.S. Appl. No. 60/969,472, filed Aug. 31, 2007.

Thione, et al., "Semantically-based highlighting of search results", U.S. Appl. No. 60/969,478, filed Aug. 31, 2007.

Salvetti, et al., "Integration of coreference resolution in an ambiguity-sensitive natural language processing pipeline for a search platform", U.S. Appl. No. 60/969,483, filed Aug. 31, 2007.

Thione, et al.,"Fact-based indexing for natural language search", U.S. Appl. No. 60/969,486, filed Aug. 31, 2007.

Thione, et al., "Attribute-value mapping to map structural information about entities to ontologies", U.S. Appl. No. 60/969,488, filed Aug. 31, 2007.

Thione, et al., "Indexing and ranking role hierarchies search index", U.S. Appl. No. 60/969,490, filed Aug. 31, 2007.

Thione, et al., "Efficient posting layout for retrieval of terms in dominance hierarchies", U.S. Appl. No. 60/969,495, filed Aug. 31, 2007.

Salvetti, et al., "A system for browsing knowledge on the basis of semantic relations", U.S. Appl. No. 60/971,061, filed Sep. 10, 2007.

International Search Report dated Apr. 29, 2009 in International Application No. PCT. No. PCT/US08/074981.

U.S. Official Action dated Jan. 3, 2011 in U.S. Appl. No. 12/201,596.

Jun et al., "Keyfact-Based Information Retrieval System", TaeJon, Korea, downloaded Mar. 18, 2011 from http://www.dl.slis.tsukuba.ac.jp/ISDL97/proceedings/miseon/miseon.html, 6 pages.

Tablan et al., "A Natural Language Query Interface to Structured Information", downloaded Mar. 18, 2011 from http://www.eswc2008.org/final-pdfs-for-web-site/onl-2.pdf, 15 pages..

U.S. Official Action dated Jun. 22, 2011 in U.S. Appl. No. 12/201,596.

* cited by examiner

SEMI-AUTOMATIC EXAMPLE-BASED INDUCTION OF SEMANTIC TRANSLATION RULES TO SUPPORT NATURAL LANGUAGE SEARCH

CROSS-REFERENCE TO RELATED APPLICATIONS

This application claims the benefit of U.S. provisional patent application No. 60/969,472, filed on Aug. 31, 2007, and U.S. provisional patent application No. 60/969,486, also filed on Aug. 31, 2007, which are expressly incorporated herein by reference in their entirety.

BACKGROUND

The advancement of computer networks has enabled vast amounts of information to be shared across multiple computers. These networks may include smaller private networks, such as enterprise networks, as well as larger, publicly-accessible networks, such as the Internet. As the amount of information that is shared over computer networks has increased, the ability for users to retrieve desired information in an efficient manner has become increasingly important.

Search engines have been developed to address the problem of finding desired information on a network. In a typical implementation, a user enters one or more search terms into a dialog box provided by a search engine. Upon receiving the search terms from the user, the search engine then returns search results based on the search terms. For example, the search engine may return a list of network locations, such as uniform resource locators ("URLs"), that link to documents containing one or more of the search terms. This approach is commonly referred to as a keyword search.

Although keyword searching is the prevalent technology implemented in many conventional search engines, keyword searching has significant drawbacks. In particular, humans typically ask questions in a format that is not conducive to keyword search. For example, a user may enter a question "is a butterfly as small as a mouse?" into a conventional search engine. Upon receiving the question, the conventional search engine may blindly search for documents that include the terms "is," "a," "butterfly," "as," "small," and "mouse." The search engine may even ignore common terms, such as "is," "a," and "as." In this case, the search engine will simply return documents containing the terms "butterfly," "small," and "mouse."

The documents returned by the conventional search engine may be entirely unrelated to the user's question. For example, the search engine may return documents describing small butterflies, small mice, and/or other irrelevant information, rather than documents describing the size of butterflies in relation to the size of mice. That is, the question "is a butterfly as small as a mouse?" is actually a question about the relative sizes of butterflies and mice. While a human instinctively recognizes this meaning, search engines performing a keyword search generally do not have this ability. As a result, conventional search engines may not effectively resolve many natural language queries.

It is with respect to these considerations and others that the disclosure made herein is presented.

SUMMARY

Technologies are described herein for generating a semantic translation rule to support natural language search. In particular, a translation rule may be induced based on example natural language expressions. Although the expressions may have similar meaning, the semantic representations corresponding to the expressions may be different. The translation rule may be applied during content acquisition to semantic representations that are stored in the semantic index. The translation rule may also be applied during user search to semantic representations of queries.

According to one embodiment presented herein, technologies are provided for generating a semantic translation rule to support natural language search. In this embodiment, a first expression and a second expression are received. A first representation is generated based on the first expression, and a second representation is generated based on the second expression. Aligned pairs of a first term in the first representation and a second term in the second representation are determined. For each aligned pair, the first term in the first representation and the second term in the second representation are replaced with a variable associated with the aligned pair. Upon replacing the variables that correspond to the aligned pairs with the generic variable, word facts that occur in both the first representation and the second representation are removed from the first representation and the second representation. Upon removing the word facts that correspond to the replaced variables, the remaining word facts in the first representation are replaced with a broader representation of the word facts. Upon replacing the remaining word facts in the first representation with the broader representation, the translation rule including the first representation, an operator, and the second semantic representation is generated.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for inducing translation rules based on examples. These translation rules may be implemented by a search engine (e.g., a natural language-based search engine) in order to increase matches between search queries and search results. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
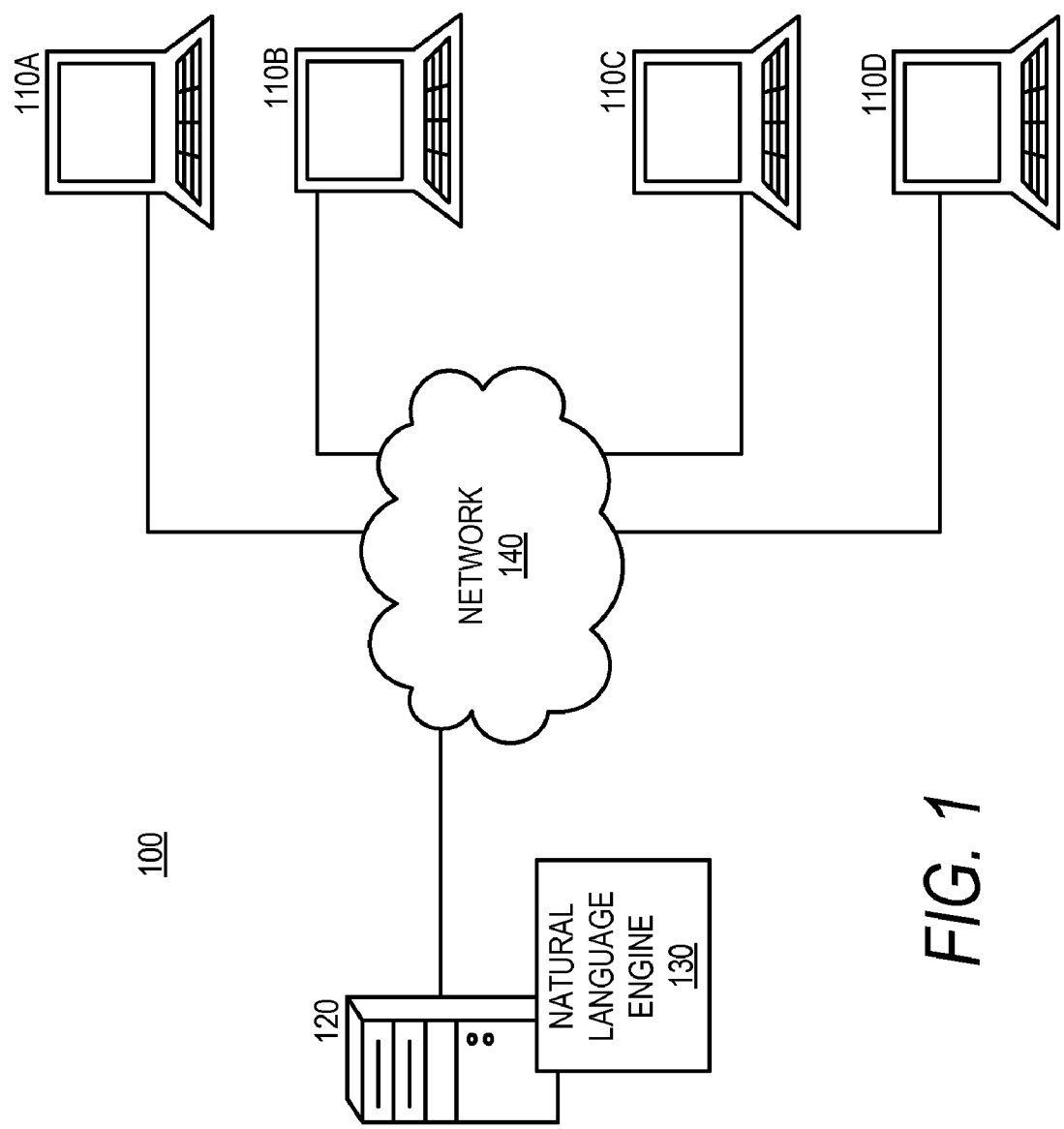
FIG. 1 is an operating environment for performing natural language search, in accordance with one embodiment.

In the following detailed description, references are made to the accompanying drawings that form a part hereof, and which are shown by way of illustration specific embodiments or examples. Referring now to the drawings, in which like numerals represent like elements through the several figures, a computing system and methodology for supporting natural language search will be described. Turning now to FIG. 1, details will be provided regarding an illustrative operating environment for the implementations presented herein. In particular, a network architecture diagram 100 illustrates an information search system according to an embodiment presented herein. Client computers 110A-110D can interface through a network 140 to a server 120 to obtain information associated with a natural language engine 130. While four client computers 110-110D are illustrated, it should be appreciated that any number of client computers 110A-110D may be in use. The client computers 110A-110D may be geographically distributed across a network 140, collocated, or any combination thereof. While a single server 120 is illustrated, it should be appreciated that the functionality of the server 120 may be distributed over any number of multiple servers 120. Such multiple servers 120 may be collocated, geographically distributed across a network 140, or any combination thereof.

According to one or more embodiments, the natural language engine 130 may support search engine functionality. In a search engine scenario, a user query may be issued from a client computer 110A-110D through the network 140 and on to the server 120. The user query may be in a natural language format. At the server, the natural language engine 130 may process the natural language query to support a search based upon syntax and semantics extracted from the natural language query. Results of such a search may be provided from the server 120 through the network 140 back to the client computers 110A-110D.

One or more search indexes may be stored at, or in association with, the server 120. Information in a search index may be populated from a set of source information, or a corpus. For example, in a web search implementation, content may be collected and indexed from various web sites on various web servers (not illustrated) across the network 140. Such collection and indexing may be performed by software executing on the server 120, or on another computer (not illustrated). The collection may be performed by web crawlers or spider applications. The natural language engine 130 may be applied to the collected information such that natural language content collected from the corpus may be indexed based on syntax and semantics extracted by the natural language engine 130. Indexing and searching is discussed in further detail with respect to FIG. 2.

The client computers 110A-110D may act as terminal clients, hypertext browser clients, graphical display clients, or other networked clients to the server 120. For example, a web browser application at the client computers 110A-110D may support interfacing with a web server application at the server 120. Such a browser may use controls, plug-ins, or applets to support interfacing to the server 120. The client computers 110A-110D can also use other customized programs, applications, or modules to interface with the server 120. The client computers 110A-110D can be desktop computers, laptops, handhelds, mobile terminals, mobile telephones, television set-top boxes, kiosks, servers, terminals, thin-clients, or any other computerized devices.

The network 140 may be any communications network capable of supporting communications between the client computers 110A-110D and the server 120. The network 140 may be wired, wireless, optical, radio, packet switched, circuit switched, or any combination thereof. The network 140 may use any topology, and links of the network 140 may support any networking technology, protocol, or bandwidth such as Ethernet, DSL, cable modem, ATM, SONET, MPLS, PSTN, POTS modem, PONS, HFC, satellite, ISDN, WiFi, WiMax, mobile cellular, any combination thereof, or any other data interconnection or networking mechanism. The network 140 may be an intranet, an internet, the Internet, the World Wide Web, a LAN, a WAN, a MAN, or any other network for interconnection computers systems.

It should be appreciated that, in addition to the illustrated network environment, the natural language engine 130 can be operated locally. For example, a server 120 and a client computer 110A-110D may be combined onto a single computing device. Such a combined system can support search indexes stored locally or remotely.

Figure 2:
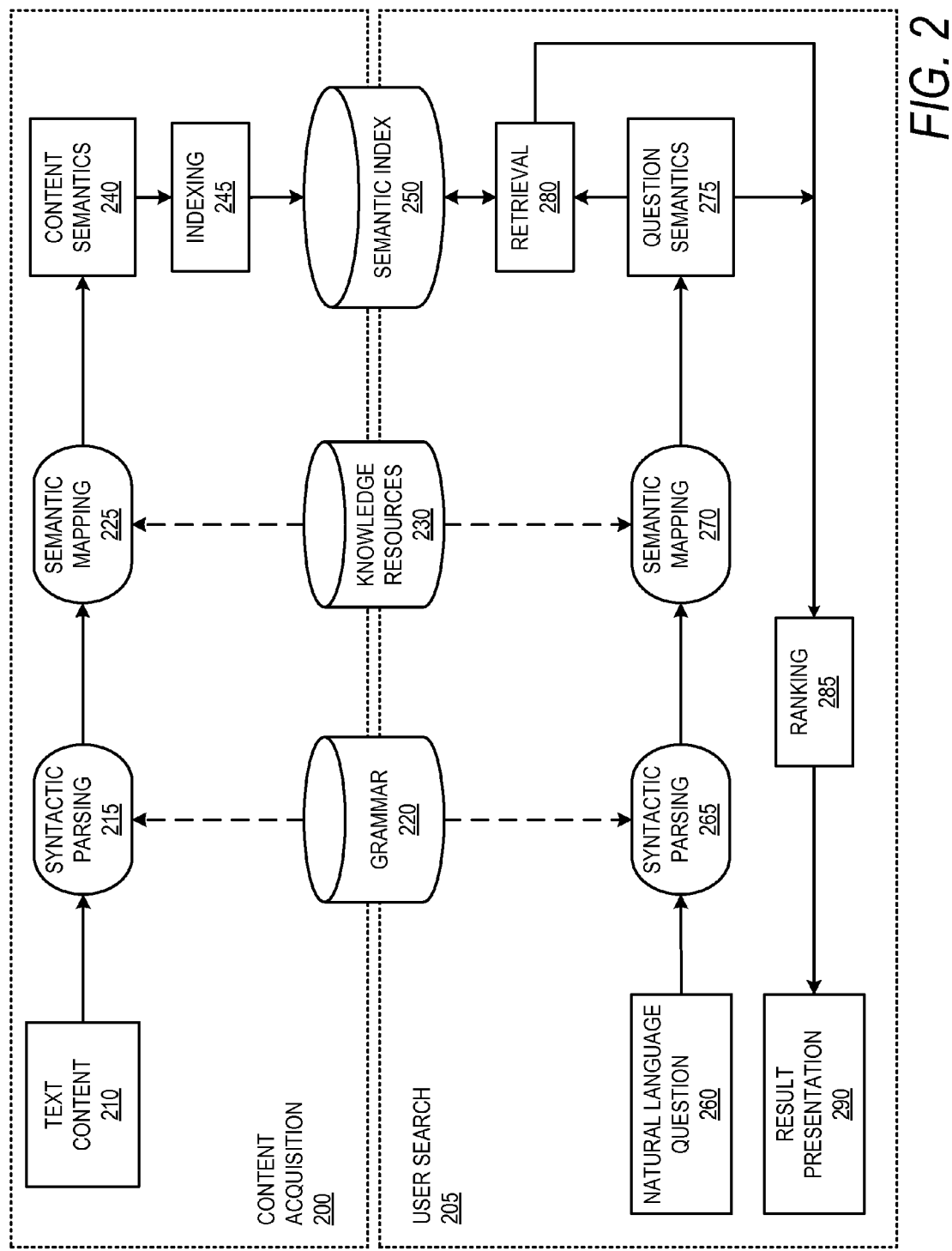
FIG. 2 is a block diagram showing components of a natural language engine, in accordance with one embodiment.

Referring now to FIG. 2, a functional block diagram illustrates various components of a natural language engine 130 according to one exemplary embodiment. As discussed above, the natural language engine 130 can support information searches. In order to support such searches, a content acquisition process 200 is performed. Operations related to content acquisition 200 extract information from documents provided as text content 210. This information can be stored in a semantic index 250 that can be used for searching. Operations related to a user search 205 can support processing of a user entered search query. The user query can take the form of a natural language question 260. The natural language engine 130 can analyze the user input to translate a query into a representation to be compared with information represented within the semantic index 250. The content and structuring of information in the semantic index 250 can support rapid matching and retrieval of documents, or portions of documents, that are relevant to the meaning of the query or natural language question 260.

The text content 210 may comprise documents in a very general sense. Examples of such documents can include web pages, textual documents, scanned documents, databases, information listings, other Internet content, or any other information source. This text content 210 can provide a corpus of information to be searched. Processing the text content 210 can occur in two stages as syntactic parsing 215 and semantic mapping 225. Preliminary language processing steps may occur before, or at the beginning of parsing 215. For example, the text content 210 may be separated at sentence boundaries. Proper nouns may be identified as the names of particular people, places, objects or events. Also, the grammatical properties of meaningful word endings may be determined. For example, in English, a noun ending in "s" is likely to be a plural noun, while a verb ending in "s" may be a third person singular verb.

Parsing 215 may be performed by a syntactic analysis system such as the Xerox Linguistic Environment (XLE). The parser 215 can convert sentences to representations that make explicit the syntactic relations among words. The parser 215 can apply a grammar 220 associated with the specific language in use. For example, the parser 215 can apply a grammar 220 for English. The grammar 220 may be formalized, for example, as a Lexical Functional Grammar (LFG), or through other grammatical formalisms like Head-Driven Phrase Structure Grammar (HPSG), Combinatory Categorial Grammar (CCG), Probabilistic Context-free Grammar (PCFG) or any other parsing framework. The grammar 220 can specify possible ways for constructing meaningful sentences in a given language. The parser 215 may apply the rules of the grammar 220 to the strings of the text content 210.

A grammar 220 may be provided for various languages. For example, LFG grammars have been created for English, French, German, Chinese, and Japanese. Other grammars may be provided as well. A grammar 220 may be developed by manual acquisition where grammatical rules are defined by a linguist or dictionary writer. Alternatively, machine learning acquisition can involve the automated observation and analysis of many examples of text from a large corpus to automatically determine grammatical rules. A combination of manual definition and machine learning may be also be used in acquiring the rules of a grammar 220.

The parser 215 can apply the grammar 220 to the text content 210 to determine syntactic structures. In the case of an LFG, these will include constituent structures (c-structures) and functional structures (f-structures). The c-structure can represent a hierarchy of constituent phrases and words. The f-structure can encode roles and relationships between the various constituents of the c-structure. The f-structure can also represent information derived from the forms of the words. For example, the plurality of a noun or the tense of a verb may be specified in the f-structure.

During a semantic mapping process 225 that follows the parsing process 215, information can be extracted from the syntactic structures and combined with information about the meanings of the words in the sentence. A semantic map or semantic representation of a sentence can be provided as content semantics 240. Semantic mapping 225 can augment the syntactic relationships provided by the parser 215 with conceptual and relational properties of individual words. The results can be transformed into representations of the meaning of sentences from the text content 210. Semantic mapping 225 can determine roles played by words in a sentence. For example, the subject performing an action, something used to carry out the action, or something being affected by the action. For the purposes of search indexing, words can be stored in a semantic index 250 along with their roles. Thus, retrieval from the semantic index 250 can depend not merely on a word in isolation, but also on the meaning of the word in the sentences in which it appears within the text content 210. Semantic mapping 225 can support disambiguation of terms, determination of antecedent relationships, and expansion of terms by synonym, hypernym, or hyponym.

Semantic mapping 225 can apply knowledge resources 230 as rules and techniques for extracting semantics from sentences. The knowledge resources can be acquired through both manual definition and machine learning, as discussed with respect to acquisition of grammars 220. The semantic mapping 225 process can provide content semantics 240 in a semantic extensible markup language (semantic XML or semxml) representation. Content semantics 240 can specify roles played by words in the sentences of the text content 210. The content semantics 240 can be provided to an indexing process 245.

An index can support representing a large corpus of information so that the locations of words and phrases can be rapidly identified within the index. A traditional search engine may use keywords as search terms such that the index maps from keywords specified by a user to articles or documents where those keywords appear. The semantic index 250 can represent the semantic meanings of words in addition to the words themselves. Semantic relationships can be assigned to words during both content acquisition 200 and user search 205. Queries against the semantic index 250 can be based on not only words, but words in specific roles. The roles are those played by the word in the sentence or phrase as stored in the semantic index 250. The semantic index 250 can be considered an inverted index that is a rapidly searchable database whose entries are semantic words (i.e. word in a given role) with pointers to the documents, or web pages, on which those words occur. The semantic index 250 can support hybrid indexing. Such hybrid indexing can combine features and functions of both keyword indexing and semantic indexing.

User entry of queries can be supported in the form of natural language questions 260. The query can be analyzed through a natural language pipeline similar, or identical, to that used in content acquisition 200. That is, the natural language question 260 can be processed by a parser 265 to extract syntactic structure. Following syntactic parsing 265, the natural language question 260 can be processed for semantic mapping 270. The semantic mapping 270 can provide question semantics 275 to be used in a retrieval process 280 against the semantic index 250 as discussed above. The retrieval process 280 can support hybrid index queries where both keyword index retrieval and semantic index retrieval may be provided alone or in combination.

In response to a user query, results of retrieval 280 from the semantic index 250 along with the question semantics 275 can inform a ranking process 285. Ranking can leverage both keyword and semantic information. During ranking 285, the results obtained by retrieval 280 can be ordered by various metrics in an attempt to place the most desirable results closer to the top of the retrieved information to be provided to the user as a result presentation 290.

Embodiments will now be described that enable the induction of a translation rule based on two or more example natural language expressions. In one embodiment, the induced translation rule is stored in the knowledge resources 230. As used herein, the term "translation rule" refers to a conversion of one semantic representation to another semantic representation. In particular, the semantic mapping 225 and/or the semantic mapping 270 may convert a narrower semantic representation to a broader semantic representation.

During the content acquisition 200, the broader semantic representation may provide additional search results that are stored in the semantic index 250. The additional search results enable a greater number of matches with search queries. For example, the semantic mapping 225 may apply a translation rule to broaden a semantic representation of the expression "John loves Mary" to a semantic representation that includes both the expressions "John loves Mary" and "John adores Mary." In this way, documents that include either of the expressions "John loves Mary" or "John adores Mary" can be returned for the search query "John loves Mary."

During the user search 205, the broader semantic representation may represent a broadened search query, which can be matched with an increased number of search results when searched against the semantic index 250. For example, the semantic mapping 270 may apply a translation rule to broaden a semantic representation of the search query "John throws a ball" to a semantic representation of the search query "'John throws a ball' or 'John tosses a ball.'" In this way, search results that include either of the expressions "John throws a ball" or "John tosses a ball" will be returned for the search query "John throws ball."

Figure 3:
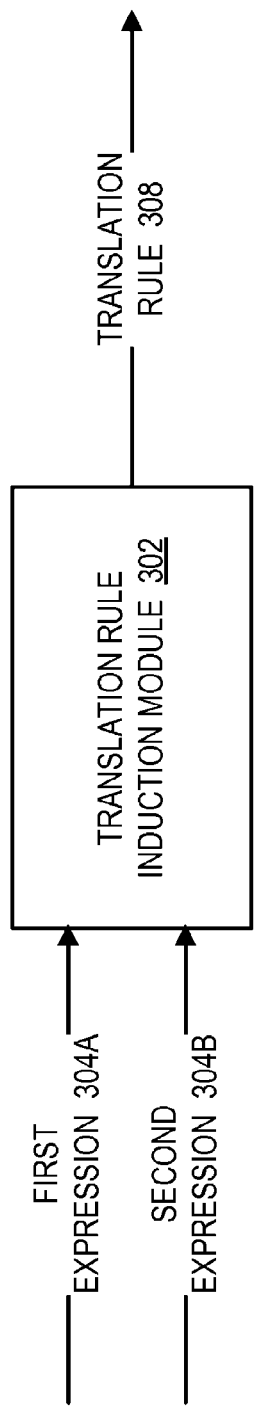
FIG. 3 is a block diagram showing an operation of a translation rule induction module, in accordance with one embodiment.

Referring now to FIG. 3, details will be provided regarding an illustrative operation of a translation rule induction module 302. The translation rule induction module 302 may be implemented as hardware, software, firmware, or combinations thereof. According to embodiments, the translation rule induction module 302 accepts as input two or more example natural language expressions, such as a first expression 304A and a second expression 304B (collectively referred to as expressions 304 or paraphrase expressions 304). Upon receiving the expressions 304, the translation rule induction module 302 generates a translation rule 308. The translation rule 308 may then be utilized, as previously discussed, by the semantic mapping 225 and/or the semantic mapping 270.

The first expressions 304A and the second expressions 304B are known to be expressions with the same or similar meaning but have different semantic representations. For example, the first expression 304A may be "John loves Mary" while the second expression 304B may be "John dotes on Mary." In this case, the presence of the different verbs (i.e., "love" and "dote on") creates different semantic representations, although the verbs "love" and "dote on" have a similar meaning. As described in greater detail below, the translation rule induction module 302 may induce a translation rule, such as the translation rule 308, from the expressions "X loves Y" and "X dotes on Y" based on the similarity between the verbs "love" and "dote on," as exemplified by the paraphrase expressions 304A and 304B. In particular, the translation rule induction module 302 may induce the similarity between the verbs "love" and "dote on" without being explicitly being provided with this fact, other than through selection of the paraphrase expressions 304A and 304B.

It should be appreciated that the translation rule induction module 302 may not generate a translation rule, such as the translation rule 308, when the inputted expressions, such as the expressions 304, have matching semantic representations, even when the expressions are syntactically different. For example, the expressions "John loves Mary" and "Mary is loved by John," although syntactically different, correspond to the same semantic representation. In particular, the verb (i.e., "love"), the subject of the verb (i.e., "John"), and the object of the verb (i.e., "Mary") are the same for both expressions.

Figure 4:
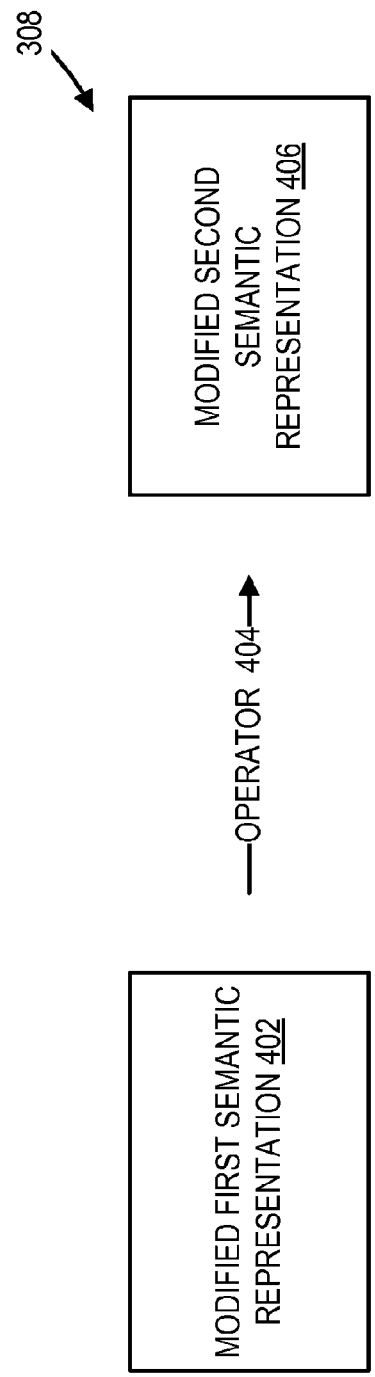
FIG. 4 is a block diagram showing a structure of a translation rule, in accordance with one embodiment.

Referring now to FIG. 4, an illustrative implementation of the translation rule 308 will be described. As illustrated in FIG. 4, the translation rule 308 includes a modified first semantic representation 402, a modified second semantic representation 406, and an operator 404 between the modified first semantic representation 402 and the modified second semantic representation 406. The modified first semantic representation 402 corresponds to a pattern generalizing the first expression 304A, and the modified second semantic representation 406 corresponds to a pattern generalizing the second expression 304B.

According to embodiments, the modified first semantic representation 402 specifies the format of an input of the translation rule 308, and the modified second semantic representation 406 specifies a conversion of the input performed by the translation rule 308. The operator 404 specifies a logical operation between the modified first semantic representation 402 and the modified second semantic representation. During the application of the translation rule 308 on a given semantic representation, the semantic representation is matched with the modified first semantic representation 402, and the operator 404 constructs new semantic representation matching the modified second semantic representation 406.

Figure 5:
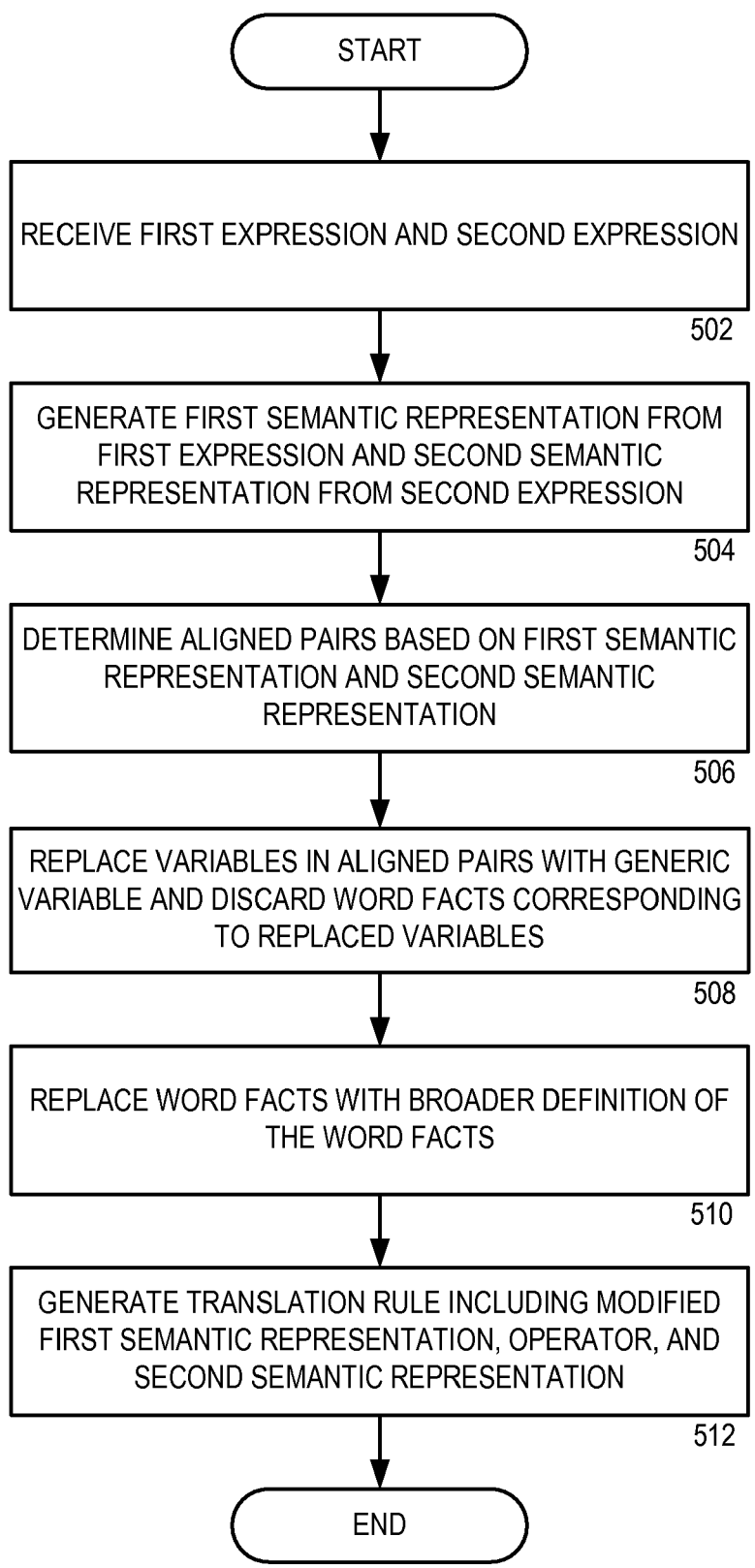
FIG. 5 is a flow diagram showing a method for generating a translation rule to support natural language search, in accordance with one embodiment.

Referring now to FIG. 5, additional details will be provided regarding the operation of the translation rule induction module 302. In particular, FIG. 5 is a flow diagram illustrating one method provided herein for generating a translation rule, such as the translation rule 308. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

As illustrated in FIG. 5, a routine 500 begins at operation 502, where the translation rule induction module 302 receives two or more example natural language expressions, such as the first expression 304A and the second expression 304B. As previously discussed, the first expression 304A and the second expression 304B have different semantic representations but have the same or a similar meaning. In an illustrative example, the first expression 304A is "John dotes on Mary" and the second expression 304B is "John loves Mary." Upon receiving the expressions 304, the routine 500 proceeds to operation 504.

At operation 504, the translation rule induction module 302 parses the first expression 304A and the second expression 304B into a first semantic representation and a second semantic representation, respectively. If more than one parse is available, a heuristic or other suitable process may be used to choose one parse according to any suitable technique. For example, the most probable parse may be selected, or a random parse may be selected. Alternatively, parses may be selected that minimize the degree of mismatch between the representations 304A and 304B. As used herein, the term "semantic representation" refers to a conjunction of goals. As used herein, the term "goal" refers to either a word fact or a role. The term "word fact" refers to a designation of a natural language word, and the term "role" refers to a relationship between the two word facts. The semantic representation facilitates the matching of syntactically different expressions. The word facts and the roles may be derived from a suitable semantic lexicon, such as a Wordnet or Verbnet.

In the illustrative example, the expression "John dotes on Mary" may be parsed into the following first semantic representation: word (J1, name, John) & word (M1, name, Mary) & word (A1, verb, dotes) & role (subject, A1, J1) & role (on, A1, M1). Further, the expression "John loves Mary" may be parsed into the following second semantic representation: word (J2, name, John) & word (M2, name, Mary) & word (L2, verb, love) & role (subject, L2, J2) & role (object, L2, M2). In the first semantic representation and the second semantic representation, the identifier "word" refers to a word fact, and the identifier "role" refers a role. Each word fact includes a variable representing a word (e.g., J1, J2), a designation (e.g., name, verb), and the word itself. Each role includes a relationship (e.g., subject, object, on) with respect to the expression and variables representing words involved in the relationship. It should be appreciated that the semantic representations described herein are merely illustrative. Other implementations of the semantic representations may be completed by those skilled in the art. Upon parsing the expressions 304 into corresponding semantic representations, the routine 500 proceeds to operation 506.

At operation 506, the translation rule induction module 302 matches variables from the first semantic representation with variables from the second semantic representation. These matched variables or terms may be referred to as aligned pairs. In the illustrative example, the aligned pairs include J1 and J2 for the name John and M1 and M2 for the name Mary. The variables A1 and L2 do not initially match because the corresponding verbs, adore and love, are different. However, given the prior matching of the variables J1 and J2 for the John and the variables M1 and M2 for Mary and the similar role (i.e., subject) between John and Mary, the translation rule induction module 302 may induce the matching of the variables A1 and L2 and the roles "object" and "on". Any suitable induction techniques as contemplated by those skilled in the art may be utilized. Upon matching variables from semantic representations, the routine 500 proceeds to operation 508.

At operation 508, the translation rule induction module 302 replaces or renames in the first and second semantic representations the variables in the aligned pairs with a generic variable. The variables may be unique between different aligned pairs. The translation rule induction module 302 then discards the word facts corresponding to the replaced variables. In the illustrative example, following the replacement of matched variables with a generic variable, the first semantic representation may be changed to the following: word (A1L2, verb, dote) & role (subject, A1L2, J1J2) & role (on, A1L2, M1M2). Further, the second semantic representation may be changed to the following: word (A1L2, verb, love) & role (subject, A1L2, J1J2) & role (object, A1L2, M1M2). In this case, the generic variable J1J2 replaces the variables J1 and J2, and the generic variable M1M2 replaces the variables M1 and M2. While variables J1 and J2 represent the name John and variables M1 and M2 represent the name Mary, the generic variables, J1J2 and M1M2, do not correspond to any specific name. Similarly, the generic variable A1L2 also does not correspond to any specific verb. Further, the word facts for John and Mary have been discarded because they correspond to the generic variables, J1J2 and M1M2. Upon replacing the matched with variables a generic variable and discarding the word facts corresponding to the replaced variables, the routine 500 proceeds to operation 510.

At operation 510, the translation rule induction module 302 replaces the remaining word facts with a broader definition of the word facts. In the illustrative example, the word fact "word (A1L2, verb, dote)" may be replaced with "word (A1L2, verb, W) & same_or_more_specific (W, dote)." The variable W represents any given verb, and the operator "same_or_more_specific (A, B)" holds either if A=B or if A is a word with a meaning that is the same or more specific than B. Thus, while the original word fact "word (A1L2, verb, dote)" was limited to only the word "dote," the new word fact "word (A1L2, verb, W) & same_or_more_specific (W, dote)" includes the word "dote" as well as any other words that have the same or more specific meaning than dote. The broader definition of word facts may include, but is not limited to, synonyms (e.g., buy is a synonym of purchase), hypernyms/hyponyms (e.g., acquire is a hypernym of purchase), aliases, valences (e.g., grabbed is a valence of purchase).

At operation 512, the translation rule induction module 302 generates the translation rule 308 by including first semantic representation as modified by operations 508 and 510 (i.e., the modified first semantic representation 402), the second semantic representation as modified by operations 508 and 510) (i.e., the modified second semantic representation 406), and the operator 404 between the modified first semantic representation 402 and the modified second semantic representation 406. In the illustrative example, the modified first semantic representation 402 is the following: word (A1L2, verb, W) & same_or_more_specific (W, dote) & role (subject, A1L2, J1J2) & role (on, A1L2, M1M2. Further, the modified second semantic representation 406 is the following: Word (A1L2, verb, love) & role (subject, A1L2, J1J2) & role (object, A1L2, M1M2). The translation rule comprising the first and second modified semantic representations may be recorded in an equivalent abbreviated form, suitable for storage in a database or other lookup table (e.g., trans(dote:love, subject:subject, on:object)).

As previously discussed, the semantic mapping 225 and the semantic mapping 270 may apply the translation rule 308 to convert semantic representations that match the modified first semantic representation 402 into a format consistent with the translation rule 308. According to embodiments, operator 404 differs between the semantic mapping 225, which operates during the content acquisition 200, and the semantic mapping 270, which operates during the user search 205. In particular, during the content acquisition 200, the semantic representation is a search result stored in the semantic index 250. Thus, in order to increase the number of matches between search queries and the search result, the operator may be a logical conjunction. In contrast, during the user search 205, the semantic representation corresponds to a search query. Thus, in order to increase the number of matches between the search query and search results in the semantic index 250, the operator may be a logical disjunction.

In the illustrative example, during the content acquisition 200, the translation rule 308 converts the search result "Henry dotes on Susan" into "(Henry dotes on Susan) AND (Henry loves Susan)" where "AND" represents a logical AND. During the user search 205, the translation rule 308 converts the search query "Henry dotes on Susan" into "(Henry dotes on Susan) OR (Henry loves Susan)" where "OR" represents a logical OR. The logical AND in the search result provides a greater number of matches with search queries during the content acquisition 200. The logical OR in the search query provides a greater number of matches with search results during the user search 205.

It is frequently the case that different training pairs can give rise to equivalent translation rules. In order to eliminate multiple copies of the same translation rule, the equivalent translation rules may be combined. For example, the translation rule induction module 302 may be operative to filter a translation rule set by grouping together rules that are identical up to the renaming of variables and by retaining only one element of each equivalence class.

Errors in parsing and semantic analysis routines may cause the rule induction process as previously described to produce anomalous results (i.e., poor translation rules). In one embodiment, the translation rule induction module 302 may perform heuristics in order to detect poor translation rules. In one example, the translation rule induction module 302 may produce a warning if the final induced rule contains less than two variables shared between modified first semantic representation 402 and the modified second semantic representation 406. In another example, the translation rule induction module 302 may produce a warning if the final induced rule contains a word fact in the modified first semantic representation 402 that occurred in the second expression 304B or contains a word fact in the modified second semantic representation 406 that occurred in the first expression 304A.

In practice, the effectiveness of the rule induction process as previously described can be increased if a small number of relations are singled out as canonical. Example pairs are then systematically chosen so that non-canonical lexical items appear in the modified first semantic representation 402 and canonical lexical items appear in the modified second semantic representation 406. Induced translation rules then function as a normalization operation that reduces input to canonical form.

A consequence of explicitly designating certain relations as canonical is that the size of the set of induced rules can be reduced by "factoring" through canonical rules. For example, suppose that variables C1 and C2 are two canonical relations, such that there is a rule C1→C2 where "→" represents a logical operator. Then, for an arbitrary non-canonical relation L, it is not necessary to induce both the rules L→C1 and L→C2. Instead, it is sufficient to induce a rule L→C1 and change this with the C1→C2 rule.

If the procedure for analyzing expressions in semantic representations supports distinctions between different senses of the same word better than distinctions between different parts of speech, then the rule induction process as previously described can take this into account. In particular, the rule induction process may include specific word-senses for words appearing in the modified second semantic representation 406 that are involved in canonical relations.

Figure 6:
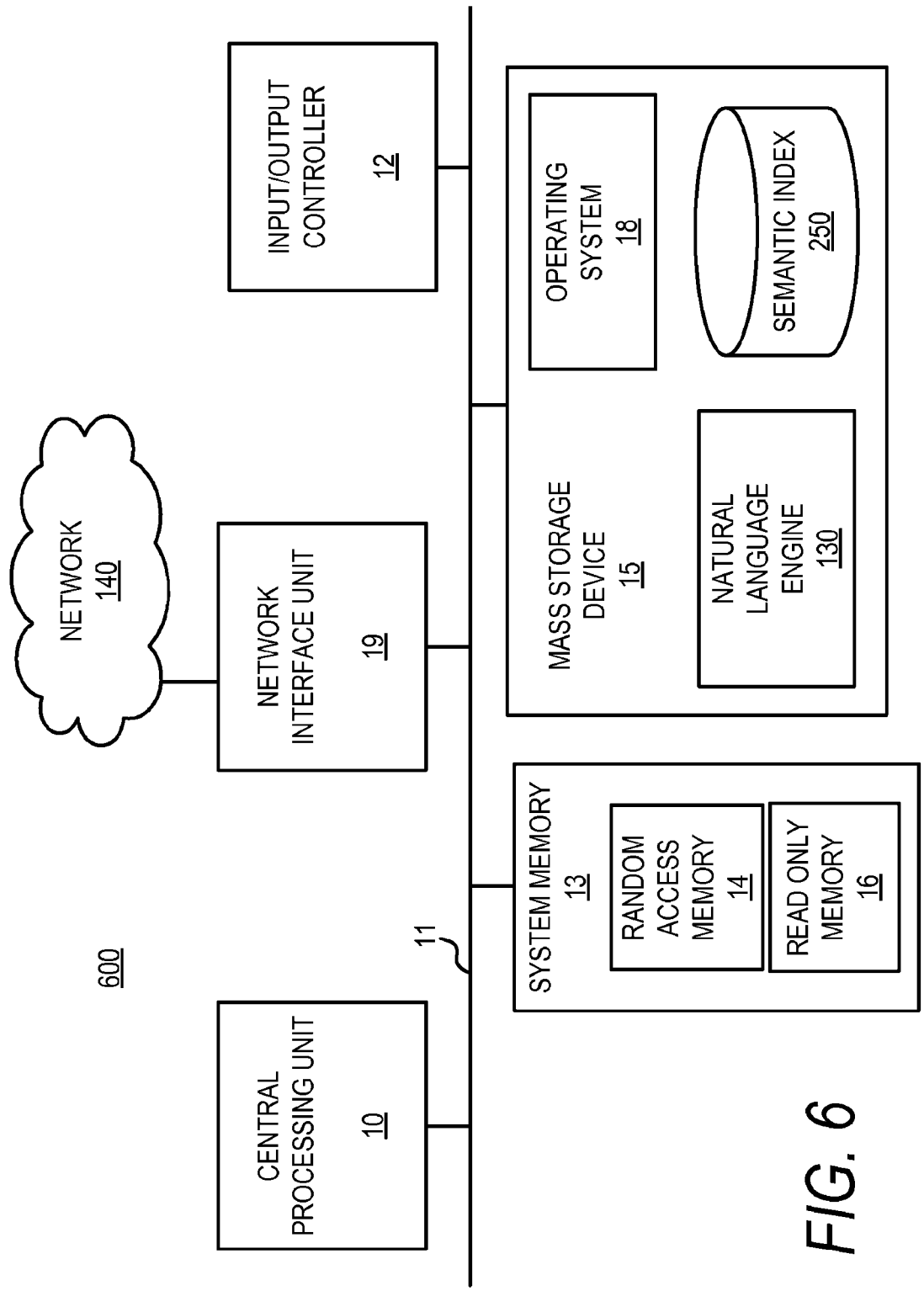
FIG. 6 is a computer architecture diagram showing an illustrative computer hardware architecture for a computing system capable of implementing aspects of the embodiments presented herein.

Turning now to FIG. 6, an illustrative computer architecture 600 can execute software components described herein for generating a translation rule based on example natural language expressions. The computer architecture shown in FIG. 6 illustrates a conventional desktop, laptop, or server computer and may be utilized to execute any aspects of the software components presented herein. It should be appreciated however, that the described software components can also be executed on other example computing environments, such as mobile devices, television, set-top boxes, kiosks, vehicular information systems, mobile telephones, embedded systems, or otherwise. Any one, or more, of the client computers 110A-110D, and the server computer 120 associated with the natural language engine 130 may be implemented as computer system 600 according to embodiments.

The computer architecture illustrated in FIG. 6 can include a central processing unit 10 (CPU), a system memory 13, including a random access memory 14 (RAM) and a read-only memory 16 (ROM), and a system bus 11 that can couple the system memory 13 to the CPU 10. A basic input/output system containing the basic routines that help to transfer information between elements within the computer 5, such as during startup, can be stored in the ROM 16. The computer 600 may further include a mass storage device 15 for storing an operating system 18, software, data, and various program modules, such as those associated with the natural language engine 130. A server computer 120 can execute portions of software components described herein. A semantic index 250 associated with the natural language engine 130 may be stored on the mass storage device 15.

The mass storage device 15 can be connected to the CPU 10 through a mass storage controller (not illustrated) connected to the bus 11. The mass storage device 15 and its associated computer-readable media can provide non-volatile storage for the computer 5. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 105. The computer 600 may connect to the network 105 through a network interface unit 19 connected to the bus 11. It should be appreciated that the network interface unit 19 may also be utilized to connect to other types of networks and remote computer systems. The computer 600 may also include an input/output controller 12 for receiving and processing input from a number of other devices, including a keyboard, mouse, or electronic stylus (not illustrated). Similarly, an input/output controller 12 may provide output to a video display, a printer, or other type of output device (also not illustrated).

As mentioned briefly above, a number of program modules and data files may be stored in the mass storage device 15 and RAM 14 of the computer 600, including an operating system 18 suitable for controlling the operation of a networked desktop, laptop, server computer, or other computing environment. The mass storage device 15, ROM 16, and RAM 14 may also store one or more program modules. In particular, the mass storage device 15, the ROM 16, and the RAM 14 may store the translation rule induction module 302 for execution by the CPU 10. The server computer 120 can include software components for implementing portions of the processes discussed in detail with respect to FIGS. 1-5. The mass storage device 15, the ROM 16, and the RAM 14 may also store other types of program modules. The mass storage device 15, the ROM 16, and the RAM 14 can also store, in part or in whole, a semantic index 250 associated with the natural language engine 130 and/or the translation rule 308.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for generating a translation rule to support natural language search, comprising:
 receiving a first expression and a second expression;
 generating a first representation based on the first expression;
 generating a second representation based on the second expression;
 determining aligned pairs of a first term in the first representation and a second term in the second representation;

replacing, for each aligned pair, the first term in the first representation and the second term in the second representation with a variable associated the aligned pair;

upon replacing the variables that correspond to the aligned pairs with the variable, removing word facts from the first representation and the second representation that occur in both the first representation and the second representation;

upon removing the word facts that correspond to the replaced variables, replacing the remaining word facts in the first representation with a broader representation of the word facts; and upon replacing the remaining word facts in the first representation with the broader representation, generating the translation rule including the first representation, an operator, and the second semantic representation.

2. The method of claim 1, wherein the first representation and the second representation comprise semantic representations.

3. The method of claim 1, wherein generating a first representation based on the first expression comprises parsing the first expression into the first representation; and wherein generating the second semantic representation based on the second expression comprises parsing the second expression into the second representation.

4. The method of claim 1, wherein the first representation and the second semantic representation each comprise the word facts and roles.

5. The method of claim 1, wherein determining aligned pairs based on the first representation and the second representation comprises:
matching variables in the first representation with variables in the second representation that correspond to the same word; and
upon matching the variables in the first representation with the variables in the second representation that correspond to the same word, matching the remaining variables in the first representation with the remaining variables in the second representation based on induction.

6. The method of claim 1, wherein replacing the remaining word facts in the first representation with a broader representation of the word facts comprises replacing the remaining word facts in the first representation with a broader representation of the word facts that include at least one of synonyms, hyponyms, hypernyms, aliases, or valences.

7. The method of claim 1, wherein the operator comprises a logical conjunction or a logical disjunction.

8. The method of claim 1, further comprising applying the translation rule during content acquisition to convert a representation of a search result that is stored in an index.

9. The method of claim 1, further comprising applying the translation rule during user search to convert a representation of a search query.

10. The method of claim 1, wherein the first expression and the second expression are semantically different.

11. A method for generating a translation rule to support natural language search, comprising:
receiving a first natural language expression and a second natural language expression, the first expression being semantically different from the second expression;
generating a first representation by parsing the first expression;
generating a second representation by parsing the second expression, the first representation and the second representation each comprising word facts and roles;
determining aligned pairs based on the first semantic representation and the second semantic representation;
replacing, in the first representation and the second representation, variables that correspond to the aligned pairs with a generic variable;
upon replacing the variables that correspond to the aligned pairs with the generic variable, removing the word facts from the first representation and the second semantic representation that that occur in both the first and second representation;
upon removing the word facts that correspond to the replaced variables, replacing the remaining word facts in the first representation with a broader representation of the word facts; and
upon replacing the remaining word facts in the first representation with the broader representation, generating the translation rule including the first representation, an operator, and the second representation.

12. The method of claim 11, wherein the representation is a semantic representation.

13. The method of claim 11, wherein determining aligned pairs based on the first representation and the second representation comprises:
matching variables in the first representation with variables in the second representation that correspond to the same word; and
upon matching the variables in the first representation with the variables in the second representation that correspond to the same word, matching the remaining variables in the first representation with the remaining variables in the second representation based on induction.

14. The method of claim 11, The method of claim 1, wherein replacing the remaining word facts in the first representation with a broader representation of the word facts comprises replacing the remaining word facts in the first representation with a broader representation of the word facts that include at least one of synonyms, hyponyms, hypernyms, aliases, or valences.

15. The method of claim 11, wherein the operator comprises a logical conjunction or a logical disjunction.

16. The method of claim 11, further comprising applying the translation rule during content acquisition to convert a representation of a search result that is stored in an index, the representation matching the first representation.

17. The method of claim 11, further comprising applying the translation rule during user search to convert a representation of a search query, the representation matching the first representation.

18. A computer-readable medium having computer-executable instructions stored thereon which, when executed by a computer, cause the computer to:
receive a first expression and a second expression, the first expression being semantically different from the second expression;
generate a first semantic representation by parsing the first expression;
generate a second semantic representation by parsing the second expression, the first semantic representation and the second semantic representation each comprising word facts and roles, the roles identifying relationships between the word facts;
determine aligned pairs based on the first semantic representation and the second semantic representation;
replace, in the first semantic representation and the second semantic representation, variables that correspond to the aligned pairs with a generic variable by matching variables in the first semantic representation with variables in the second representation that correspond to the same word and by matching the remaining variables in the first semantic representation with the remaining variables in the second semantic representation based on induction;

upon replacing the variables that correspond to the aligned pairs with the generic variable, remove the word facts from the first semantic representation and the second semantic representation that correspond to the replaced variables;

upon removing the word facts that correspond to the replaced variables, replace the remaining word facts in the first semantic representation with a broader representation of the word facts; and upon replacing the remaining word facts in the first semantic representation with the broader representation, generate a translation rule including the first semantic representation, an operator, and the second semantic representation.

19. The computer-readable storage medium of claim 18, having further computer-executable instructions stored thereon which, when executed by a computer, cause the computer to apply the translation rule during content acquisition to convert a semantic representation of a search result that is stored in a semantic index, the semantic representation matching the first semantic representation.

20. The computer-readable storage medium of claim 18, having further computer-executable instructions stored thereon which, when executed by a computer, cause the computer to apply the translation rule during user search to convert a semantic representation of a search query, the semantic representation matching the first semantic representation.

* * * * *